S. B. FLEISHER.

Devices for Holding Coils of Braid and Similar Articles.

No. 9,018. Reissued Jan. 6, 1880.

Witnesses

E. E. Masson

J. J. Masson

Inventor.

Simon B. Fleisher by Lewis Abraham attorney

N. PETERS, PHOTO-LITHOGRAPHER, WASHINGTON, D. C.

UNITED STATES PATENT OFFICE.

SIMON B. FLEISHER, OF PHILADELPHIA, PENNSYLVANIA.

DEVICE FOR HOLDING COILS OF BRAID AND SIMILAR ARTICLES.

SPECIFICATION forming part of Reissued Letters Patent No. 9,018, dated January 6, 1880.

Original No. 205,258, dated June 25, 1878. Application for Reissue filed November 6, 1879.

DIVISION A.

*To all whom it may concern:*

Be it known that I, SIMON B. FLEISHER, of Philadelphia, in the county of Philadelphia and State of Pennsylvania, have invented a new and useful Improvement in Devices for Holding Coils of Braid and Similar Articles, which improvement is fully set forth in the following specification and accompanying drawings, in which—

Figure 1:
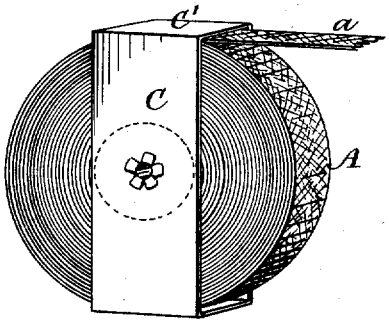
Figure 2:
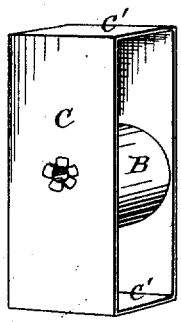
Figure 3:
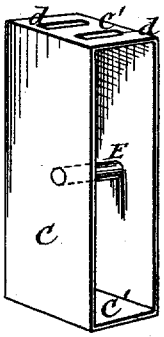
Figure 4:
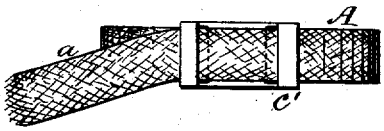

Figure 1 is a perspective view of my improved device, showing the manner of unwinding the braid. Fig. 2 is a perspective view of the frame and bobbin before any braid is introduced for winding. Fig. 3 is a view of the same, showing a pivot-pin in lieu of the bobbin, and having two elongated slots on the top part. Fig. 4 is a detail of top piece as on Fig. 3, showing the manner of drawing the braid through the slots.

Similar letters of reference designate the several parts.

The object of my invention is to furnish a convenient device, as hereinafter described, for putting up, holding, and fastening braid and similar articles in coils, so that when exposed for sale or handled for use it will not unwind by itself or be liable to be displaced laterally.

The braid is wound around or coiled upon a central bobbin, B, forming a continuous coil, A, one end commencing at the bobbin B, the other end, *a*, terminating at the periphery; or it may be wound continuously upon itself into a volute, and a central bobbin or pin inserted afterward.

Figs. 1, 2, 3, and 4 show the manner in which I preferably apply and operate my device.

The central bobbin or pin is placed within a frame consisting of two side and two end pieces, which frame is made preferably of pasteboard or any similar material having the required stiffness, and is secured to the central bobbin or pin by means of eyelets, or any suitable mechanical device, or adhesive substances. The eyelets or equivalents secure the frame rigidly to the bobbin, and do not admit of the one turning or revolving independently of the other, thus forming a rigid holding device within which the braid revolves upon the bobbin when wound or unwound, the device—viz., frame and bobbin—remaining stationary.

When the frame is secured to the central bobbin by means of a suitable adhesive material it forms a perfectly rigid holding device, which will not admit of the bobbin revolving independently of the frame and with the braid. In such case also the braid revolves upon the bobbin as an axis.

Certain characters of braid require to be loosely wound so as to maintain its normal width and not be subject to undue strain or tension. For braids so wound I use the rigid holding device, which will not admit of the bobbin revolving with the braid. The character of the braid will also, in some degree, control the rotation of the bobbin B, adjusted so as to turn on an axis when power is applied.

When the fabric forming the coil is of loose texture, it will, when wound or unwound, have a tendency to turn independent of the central bobbin or pin in whatever manner the connections are made with the sides of the frame. When, however, the fabric is closely woven and is rolled up tightly, the tension of the overlapping layers will cause the central bobbin or pin to revolve on its axis as the device is operated for use.

For some purposes, especially when the braid is fine or of smooth exterior finish, to prevent its slipping back, I pierce the upper end, C′, of the frame with two elongated quadrilateral slots, *d d*, as shown in Fig. 3. The terminal end of the braid in this case is passed upward through one slot and downward through the other, the intervening space between the two slots forming a retaining-loop. The braid, whether passed completely under the top piece, C′, of the frame, or whether interlaced through the slots *d d*, could be fed out to any required length, and then re-coiled in a smooth and uniform manner by a simple rotation of the frame on its axis, the top piece, C′, with or without slots *d d*, guiding the edges of the braid to the proper plane of the flat sides of the coil.

It is obvious that any desired length can be cut off from the end *a* without risk of displacing the remainder of the coil.

It is also obvious that the frame C can be first made without any bobbin or pin, and the braid be coiled around upon itself, then inserted in the interior of frame C, and then be transfixed with a pivot-pin.

When the bobbin is used in connection with the frame C, I connect the sides to the bobbin centrally in such a manner that the whole coil will revolve on its axis.

I show but one form of connection—namely, boring in the center of the bobbin, and then connecting the sides of the frame thereto with an ordinary eyelet; but any equivalent devices for connecting the central bobbin, B, to the sides C of the frame may be employed.

I do not desire to limit myself in the sides C C to straight parallel edges, as shown in the drawings, as it is manifest that the configuration can be changed as taste or convenience may dictate without departing from the essential features of my invention.

Having thus described my invention, what I claim as new, and desire to secure by Letters Patent, is—

1. A device for holding braid or similar articles in coils, consisting of a frame of paper or other suitable material extending across the sides and periphery of the coil, and a central bobbin or core to which the frame is rigidly secured, substantially as and for the purpose set forth.

2. A device for putting up and holding braid and similar articles in coils, consisting of the frame C C C′ C′, with or without the slots *d d*, and a central bobbin or core to which the sides C C of the frame are connected, substantially as and for the purpose set forth.

3. A frame for coils of braid having rigid supports extending over the sides and the periphery of the coil, and rigidly attached to a central pin or bobbin, substantially as described.

In testimony that I claim the foregoing I hereby sign my name this 31st day of October, 1879.

SIMON B. FLEISHER.

Witnesses:

JOSEPH A. MILLER,
WM. H. STAFFORD.